July 25, 1939.   G. P. DESPRET   2,167,294
PROCESS AND APPARATUS FOR THE HARDENING OF GLASS
Filed May 26, 1932    7 Sheets-Sheet 1
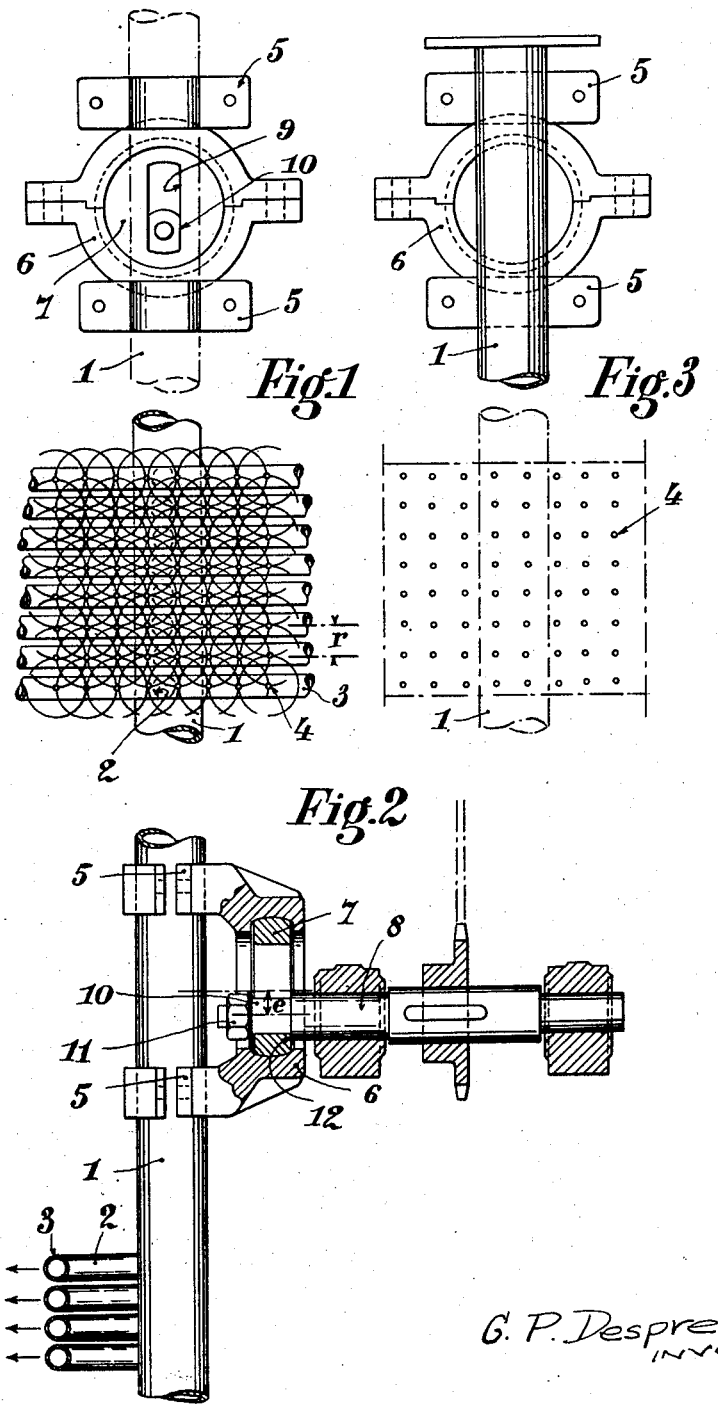

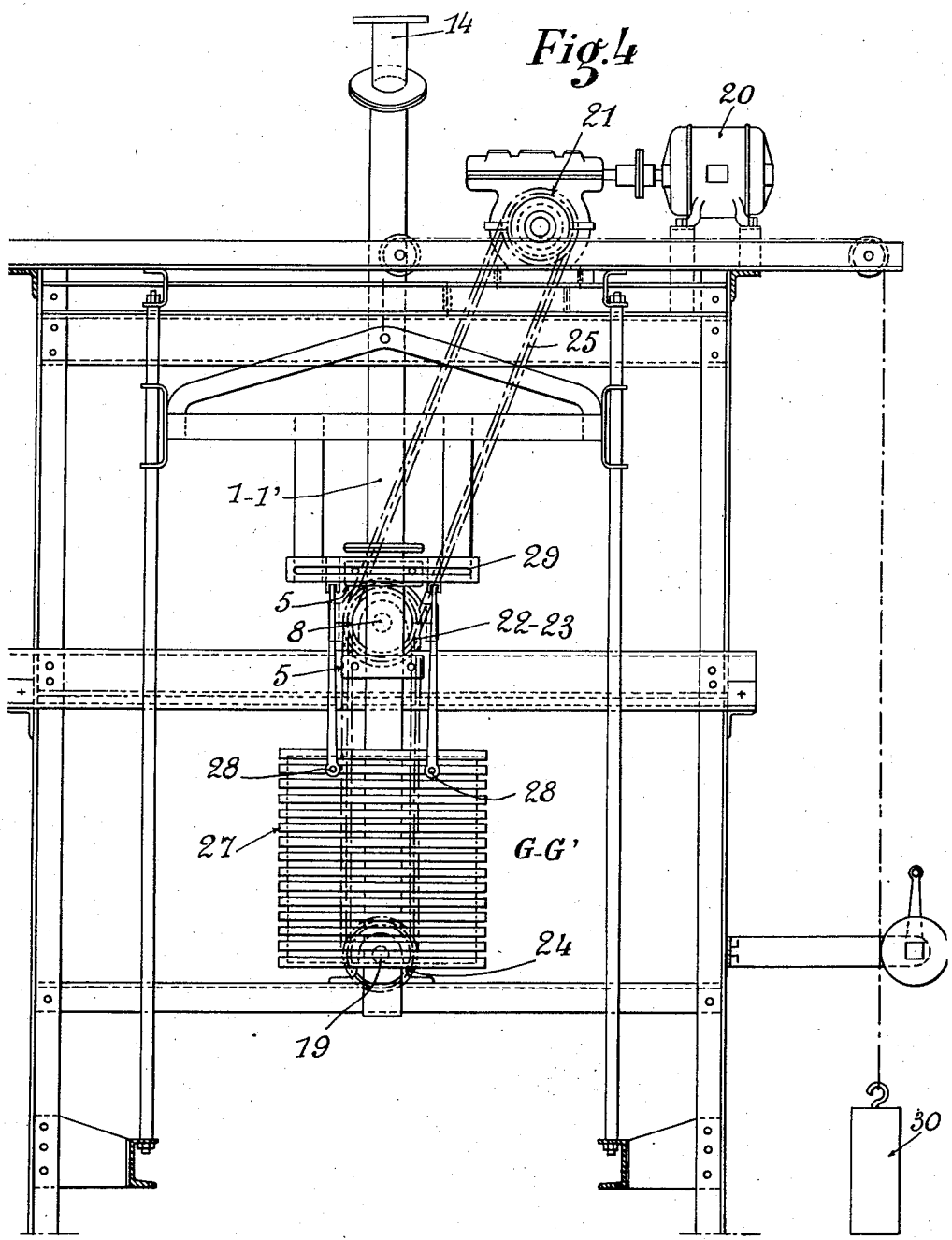

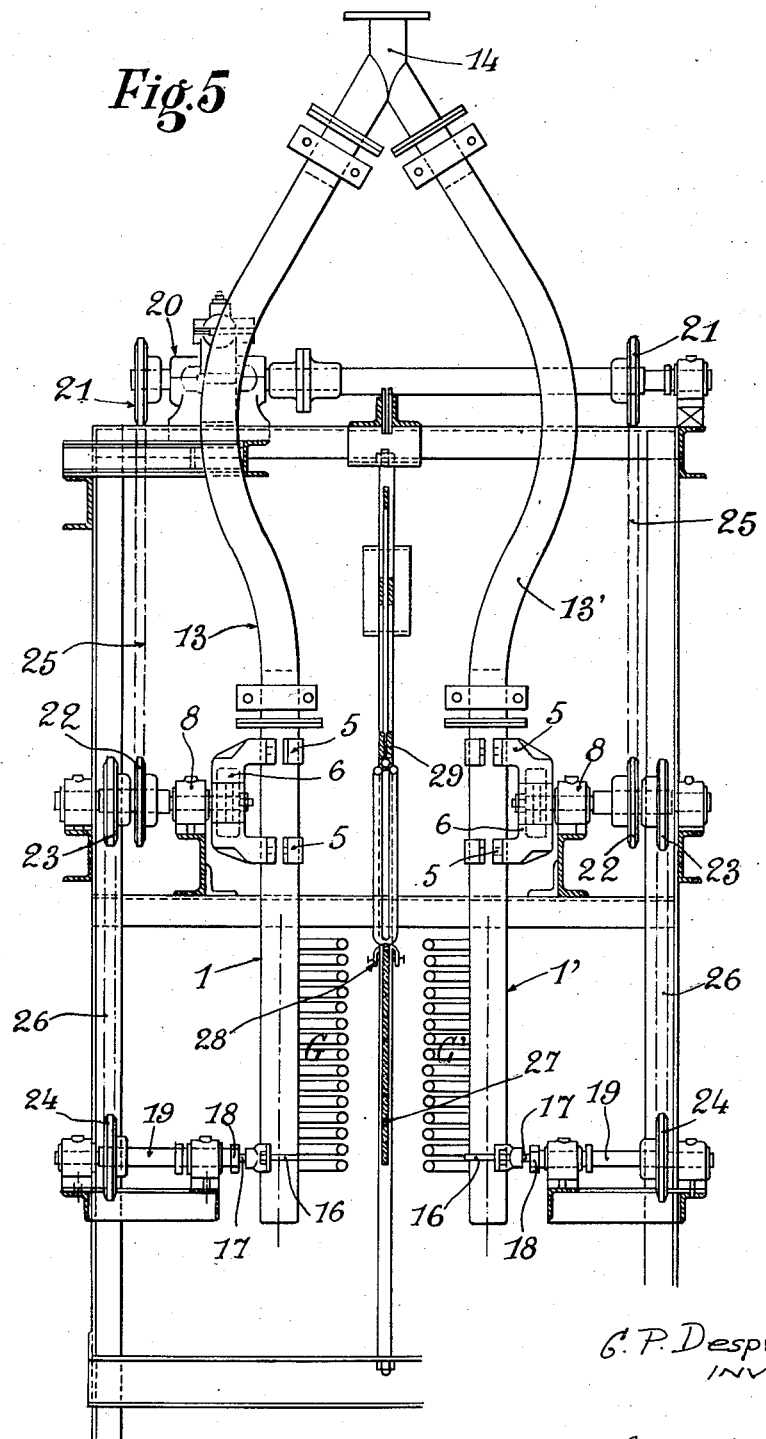

July 25, 1939. G. P. DESPRET 2,167,294
PROCESS AND APPARATUS FOR THE HARDENING OF GLASS
Filed May 26, 1932 7 Sheets-Sheet 4
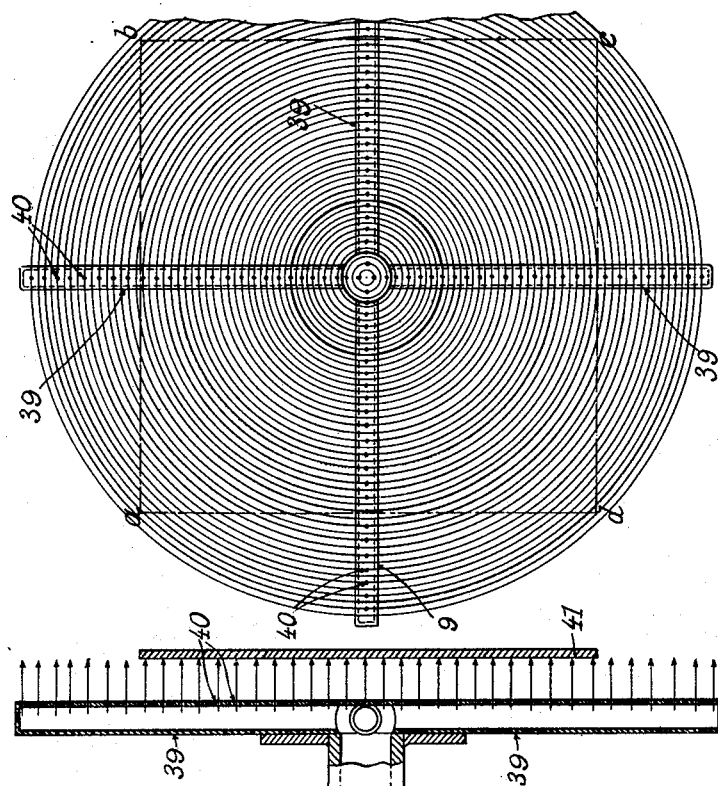
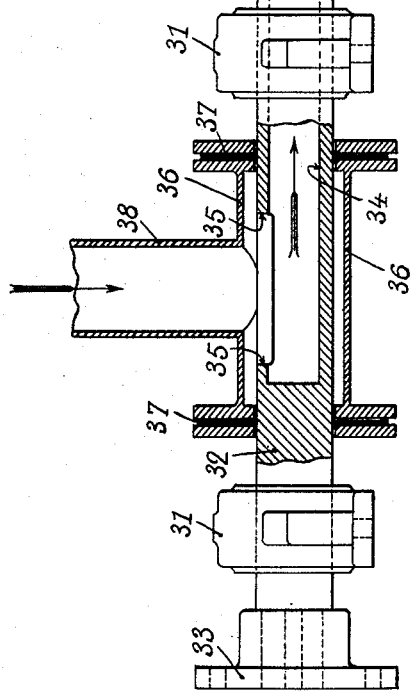
G. P. Despret
INVENTOR
By: Marks & Clerk
Attys.

July 25, 1939.  G. P. DESPRET  2,167,294
PROCESS AND APPARATUS FOR THE HARDENING OF GLASS
Filed May 26, 1932   7 Sheets-Sheet 6

G. P. Despret
INVENTOR

By Marks & Clerk
ATTYS.

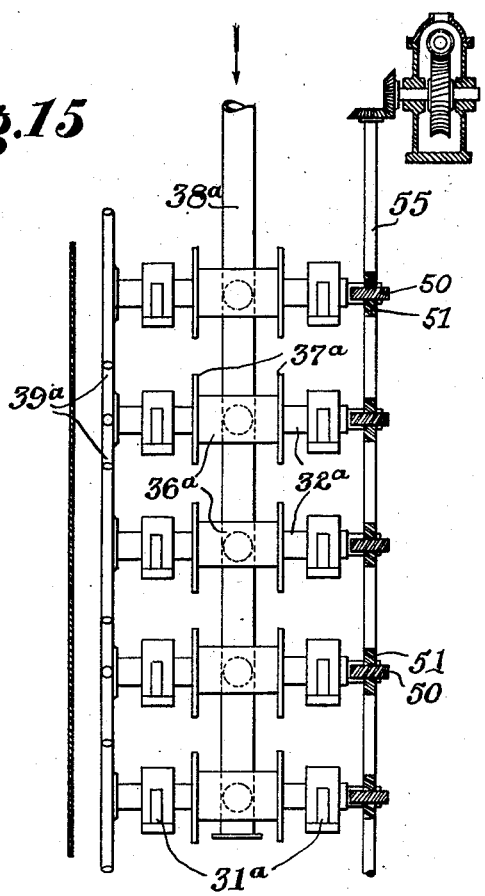
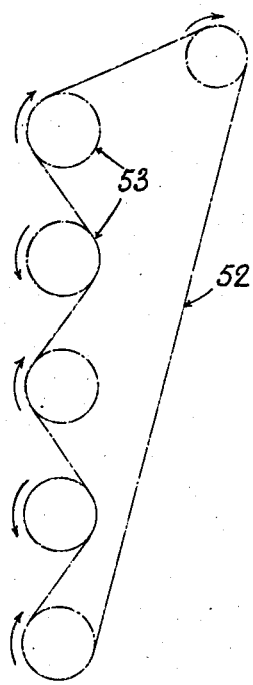
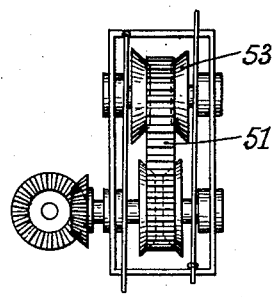

Patented July 25, 1939

2,167,294

UNITED STATES PATENT OFFICE 2,167,294

PROCESS AND APPARATUS FOR THE HARDENING OF GLASS

Georges Paul Despret, Paris, France, assignor, by mesne assignments, to The American Securit Company, a corporation of Delaware Application May 26, 1932, Serial No. 613,743
In France September 2, 1931

9 Claims. (Cl. 49—45)

The present invention relates to processes and apparatus for the hardening of glass articles.

It is a known fact that in the process for the air-hardening of glass (such as plate-glass or window-glass) streams of air are sent upon the surface to be cooled, by means of stationary perforated tubes, cases, grids or the like. However, the delivery of air at fixed points has the effect of producing a wavy surface upon the glass, as well as a certain colouring at such fixed points, and this, after the hardening operation, offers prejudice to the good appearance of the glass.

The present invention has for its object to devise a process for the hardening of glass which affords a uniform hardening in such conditions that after the glass is hardened it will no longer show wavings nor colouring and this latter can only be detected by the polariscope.

According to the invention, the cooling fluid is blown onto the surface of the glass article and the jets of fluid are moved across said surface.

The movement imparted to said jets of fluid may be either a parallel circuitous motion, of small amplitude, such as a circular motion of translation or a rotary or other suitable motion.

Another object of the invention is to devise an apparatus for carrying out said process, which comprises a hollow member supplied with cooling fluid, and provided with orifices opening opposite the surface to be treated and driving means adapted to move said hollow member.

In the accompanying drawings, which are given by way of example:

Fig. 1 is a front view of a set of tubes and of a device for driving the same;

Fig. 2 is a corresponding side view, with parts broken away;

Fig. 3 is a partial front view of a perforated receptacle according to the invention;

Fig. 4 is a front view of an installation comprising two sets of tubes which are given a circular translative motion, Fig. 5 is a corresponding side view;

Fig. 6 is an elevational view with parts broken away, of another apparatus according to the invention;

Fig. 7 is a front view of an arm-wheel which is provided with holes for the discharge of air or other cooling fluid;

Fig. 9 is an elevational view of an installation comprising two apparatus of the type shown in Fig. 6, adapted for the cooling of both sides of the plate or sheet of glass or the like;

Figure 13:
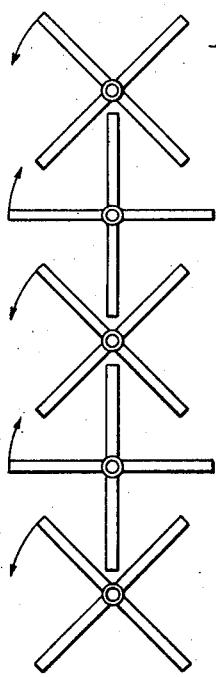
Fig. 13 is an analogous view.
Figure 14:
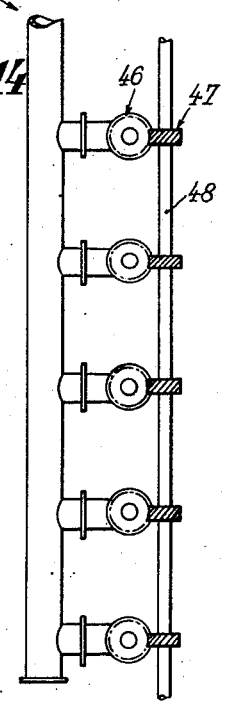

Fig. 14 relates to the driving and the supply of the arm-wheels shown in Fig. 13; and Fig. 15 is an analogous view;

Fig. 16 is a diagrammatic view showing another method of driving the arm-wheels;

Fig. 17 is a plan view of the arrangement shown in Fig. 16.

Figs. 1 and 2 represent a grid which consists, in the known manner, of a tube 1 upon which are mounted, by interposition of tubes 2, suitable tubes 3 having the transverse direction and pierced at intervals with orifices 4 for the exit of a stream of compressed air or other gaseous fluid.

Fig. 3 shows in like manner a casing which is pierced on one of its faces with suitably spaced orifices 4.

The grid (or casing) which, in the known installations, has a stationary position, is, on the contrary, according to the invention, given a suitable motion. In the examples shown in Figs. 1 to 5 the motion imparted to the grid (or receptacle) is a parallel circuitous motion, in such manner that each orifice 4 will describe a circle or other closed curve, as shown in Fig. 1. The radius $r$ of the circle is such that each circle will intersect all of the circles described by the orifices 4 which are situated around the orifice in question, and the radius may for instance be made equal to the distance between the equally-spaced orifices 4.

The driving device is preferably so arranged that the radius $r$ may be varied at will; this result may be obtained with the device shown in Figs. 1 and 2. In that embodiment the tube 1 is secured by clamping members 5 to an eccentric strap 6. The eccentric sheave 7 is mounted on a shaft 8. The eccentricity $e$ of the sheave can be adjusted to the desired value by displacing the sheave with reference to the shaft 8, and for this purpose the sheave 7 has a diametrical slot 9, for instance, in which a flat part 10 of the shaft 8 is slidable. A nut 11 serves to hold the sheave 7 against a shoulder 12 formed on the shaft 8.

The tube 1 is thus connected with the shaft 8 by a lever arm or crank whose length is $e$. On condition that another point of this tube is obliged to describe a circle whose radius is preferably equal to $e$, the grid (or casing) will be given a circular motion of translation.

Figs. 4 and 5 show the general arrangement of a hardening installation comprising two grids G—G' (or two perforated casings) whose conduits 1—1' are connected by flexible pipes 13—13' with a common conduit 14 affording a supply of compressed air or other gaseous fluid. The orifices or the two grids (or casings) face one another.

The respective conduit 1—1' of each grid (or casing) is secured at its upper part by clamping members 5 to the strap 6 of an eccentric whose sheave 7 is mounted on the shaft 8. On the lower part of each conduit 1—1' is mounted a clamping member 16 carrying an axle 17 which is pivoted to the end of a crank 18 whose other end is keyed to a shaft 19. The two shafts 8 and 19 are driven at the same time and at equal speed by suitable means, whether manual, mechanical, electric, pneumatic or the like. In the construction herein represented, the two shafts on each side are driven by an electric or other motor 20, through suitable transmission devices, such as sprocket wheels 21—22—23—24 and chains 25—26.

For each grid (or casing), the cranks consisting of the eccentric 6—7 and the crank 18 are set upon the respective shafts 8 and 19 in such manner that their axes will be parallel in all cases, and thus if these two cranks have the same length e, the different points of the grid (or casing) will move on a circular path.

The glass plate 27 to be hardened is suspended at 28 from a suitable support 29 which is equilibrated by a counterweight 30 or the like.

Instead of a parallel circuitous motion, a rotary motion may be imparted to the jets of air or other cooling fluid delivered onto the surface of the glass article. Said rotary motion has such a speed as to cause an intense stirring of the cooling fluid in contact with the glass surface whereby an uniform, intense and rapid cooling of the glass articles may be obtained. Apparatus adapted to this effect are shown in Figs. 6 to 17.

In the form of construction represented in Figs. 6 and 7, a shaft 32 is mounted in two ball-bearings 31 (preferably swivel bearings), said shaft being driven from the end by an electric or other motor, by means of an elastic coupling 33. In the shaft 32 is formed a longitudinal channel 34 which communicates laterally at 35 with a sleeve 36 which is made leakless around the shaft 32 by stuffing boxes 37. The said sleeve is connected with a pipe 38 supplying a cooling fluid (air or the like) under pressure.

At the end of the shaft is mounted an arm-wheel consisting of one or more radial arms 39; each arm has the tubular form and is connected with the channel 34 of the shaft 32, the arm being pierced with a row of small holes 40, in a direction parallel with the axis of the shaft, and along a generatrix on the opposite side with reference to said shaft.

The operation is as follows: The plate or sheet 41 of glass or other material to be hardened by cooling is mounted with its face next the arm-wheel 39, the axis of the shaft 32 being perpendicular to the said plate or sheet. The said wheel is set in rotation at a high speed, whether constant or variable. The air or other cooling fluid under pressure enters through the pipe 38, circulating thence through the channel 34 and the tubes 39 of the arm-wheel, from which it issues through the holes 40 in front of the plate or sheet 41 to be cooled.

Each hole 40 of the arm-wheel 39 describes a circular line opposite the surface 41, as shown in Fig. 7.

Thus, when arm wheel 39 rotates, there is a great number of passages of a given exit orifice before a given point of the piece 41 under treatment and the arms 39 of the said wheel effect an energetic stirring of the mass of the cooling air.

Glass panes hardened by this process, when examined through a polariscope, show a regular hardening.

The strength of the glass is increased, and there are neither wave effects nor coloration of the pieces thus treated.

The shaft 32 may obviously be rotated by any suitable means, and preferably by power transmission means comprising a chain or gear wheel 42 (Fig. 8), and in this event the air or other cooling fluid may be supplied through the free end at 44.

Figure 8:
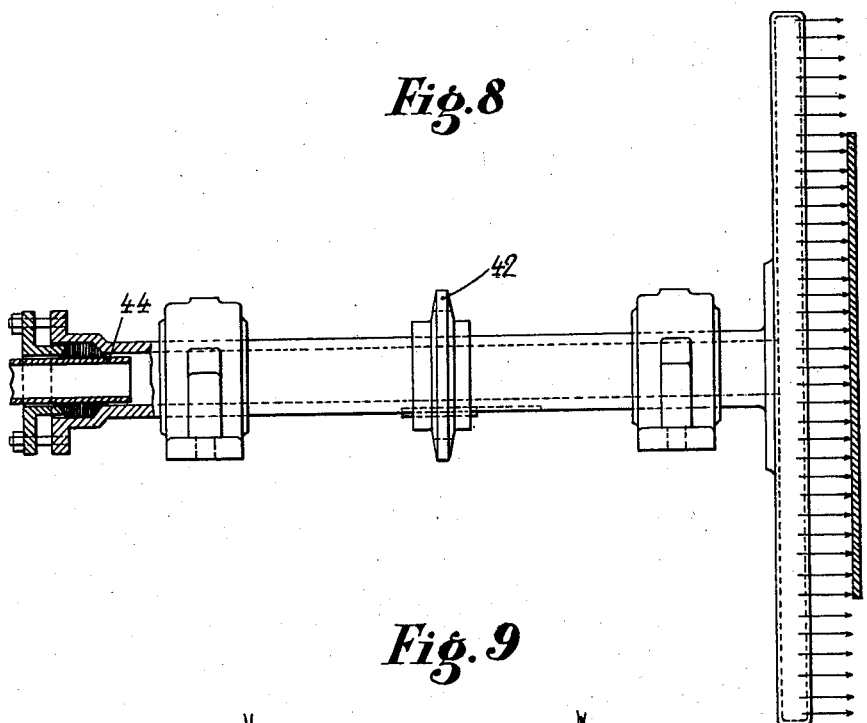
Fig. 8 shows a modification of the device shown in Fig. 6.
Figure 9:
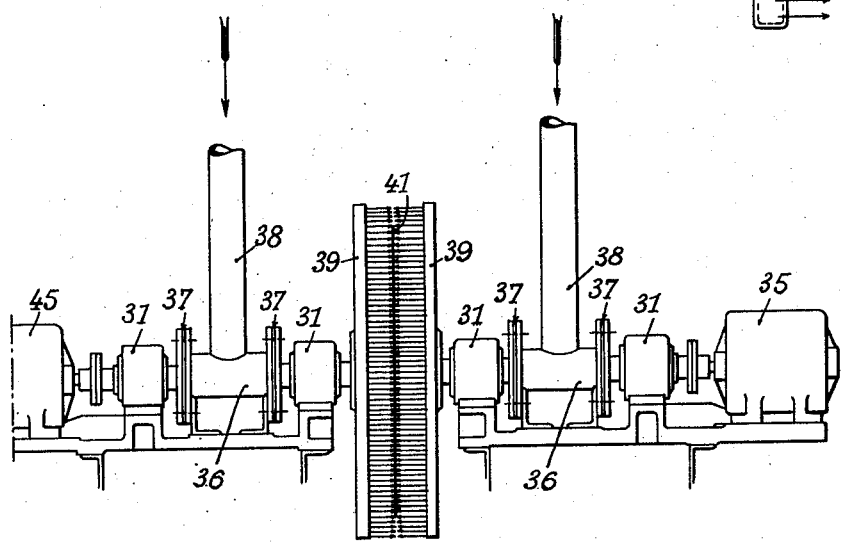
Figure 10:
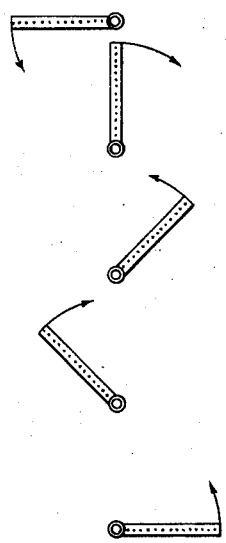
Figs. 10, 11 and 12 are diagrammatic views showing various construction which may be employed for the arm-wheels.
Figure 11:
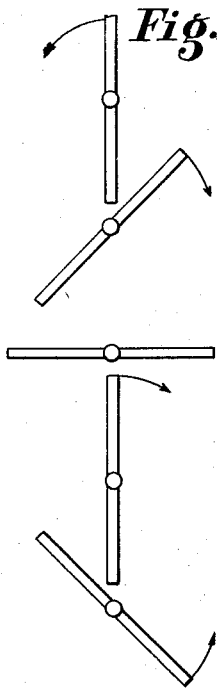
Figure 12:
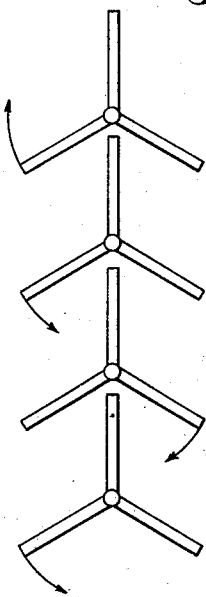

Fig. 9 shows a plant comprising two arm-wheels which are adapted for the cooling of both sides of the plate or sheet 11 of glass or other material.

Obviously, a single arm-wheel will only be used to cool a piece whose outline, such as abcd (Fig. 7) is situated within the circle described by the hole or holes 40 which are the farthest from the axis of the shaft 32.

In the case of a plate or sheet of larger size, the plant will comprise a plurality of such arm-wheels having one or more arms (Figs. 10 to 13).

The said arm-wheels may be rotated in any suitable manner according to requirements, and chiefly by direct drive by a motor 45, at constant or variable speed (Figs. 6 to 9), by worm gearing 46—47 or by bevel gearing mounted on a common vertical shaft 48 which serves for the whole installation (Fig. 14), by reducing gear comprising a worm-wheel 50 and worm 51 (Fig. 15), by any suitable change-speed device, by endless chain 52 and pulleys 53 (Figs. 16 and 17) etc.

Figure 15 represents an arrangement of the construction of Figure 6 in tandem. The detailed construction of each of the elements arranged in tandem, is clearly shown in Figure 6. Since the several elements arranged in tandem are identical, only one need be described. A secondary shaft 32ª is mounted in two ball bearings 31ª (preferably swivel bearings), said shaft being driven from one end and worm wheel 50 and worm 51 mounted on the main shaft 55. In the shaft 32ª is formed a longitudinal channel 34 (see Figure 6), which communicates laterally with a sleeve 36ª which is made leak-proof around the shaft 32ª by the stuffing boxes 37ª. The sleeve 36ª is connected with a feed pipe 38ª supplying a cooling fluid under pressure.

At the end of the shaft 32ª is mounted a hollow member having one or more radial arms 39ª. Each arm is tubular in form, and is connected with the channel formed in the shaft 32ª, the arm being pierced with a row of small holes, in a direction parallel with the axis of the shaft, and along a generatrix on the opposite side with reference to said shaft. The main shaft 55 is arranged through worms and worm wheels 51 and 50, respectively, to drive each of the blowing elements.

Obviously, the said invention is not limited to the constructional forms herein described and represented, which are given solely by way of example.

Having now described my invention, what I claim as new and desire to secure by Letters Patent is:

1. A process for manufacturing hardened glass which consists in blowing a cooling fluid onto the surface of the glass article in the hot state and moving the jets of fluid along concentric closed endless paths.

2. An apparatus for manufacturing hardened glass which comprises a hollow member provided with outlet orifices opening to the outside opposite the glass surface to be treated, means for supplying said member with cooling fluid and driving means for imparting to said member a rotary motion in a plane parallel with the glass surface to be treated.

3. An apparatus for manufacturing hardened glass comprising a main conduit adapted to be supplied with a cooling fluid, a main shaft, a plurality of hollow parallel secondary shafts, means for drivingly connecting said secondary shafts to said main shaft, means for connecting said main conduit with said hollow shafts, and hollow members provided with tubular perforated arms and secured to said secondary shafts and adapted to be supplied with cooling fluid from said main conduit through said hollow shafts.

4. In combination in apparatus for case hardening glass, means for supporting a glass sheet in a vertical plane, a pair of headers mounted for rotation on opposite sides of the plane of support of the glass sheet and each provided with a plurality of outlet passages distributed over the area thereof, means for supplying a fluid under pressure to the headers, and means for rotating the headers.

5. A process for manufacturing hardened glass which consists in blowing jets of cooling fluid onto the surface of the glass article in the hot state and moving the jets of fluid along concentric paths across said surface.

6. In an apparatus for producing hardened glass, a plurality of hollow rotating members provided with air outlet orifices, the paths of the orifices of one member intersecting the paths of orifices of adjoining members.

7. In an apparatus for producing hardened glass, the combination of a hollow member provided with air outlet orifices, means connected at distant points to the said member for guiding such points in closed endless paths, means for varying the diameter of such paths, and means for causing such points to move in the selected paths.

8. In combination in apparatus for case hardening glass, means for supporting a glass sheet in a vertical plane, a pair of headers mounted for rotation on opposite sides of the plane of support of the glass sheet and each provided with a plurality of outlet passages distributed over the area thereof, means for supplying a fluid under pressure to the headers, and means for rotating the headers.

9. An apparatus for manufacturing hardened glass comprising a hollow rotary member arranged in the form of a plurality of tubular radial arms having outlet orifices opening to the outside opposite the surface of the glass to be tempered, means for supplying said member with a cooling fluid and means for rotating said rotary member.

GEORGES PAUL DESPRET.